July 4, 1939.  E. V. FRANCIS ET AL  2,164,812
CONSTANT CAPACITY FEEDER
Filed June 10, 1936   5 Sheets-Sheet 2
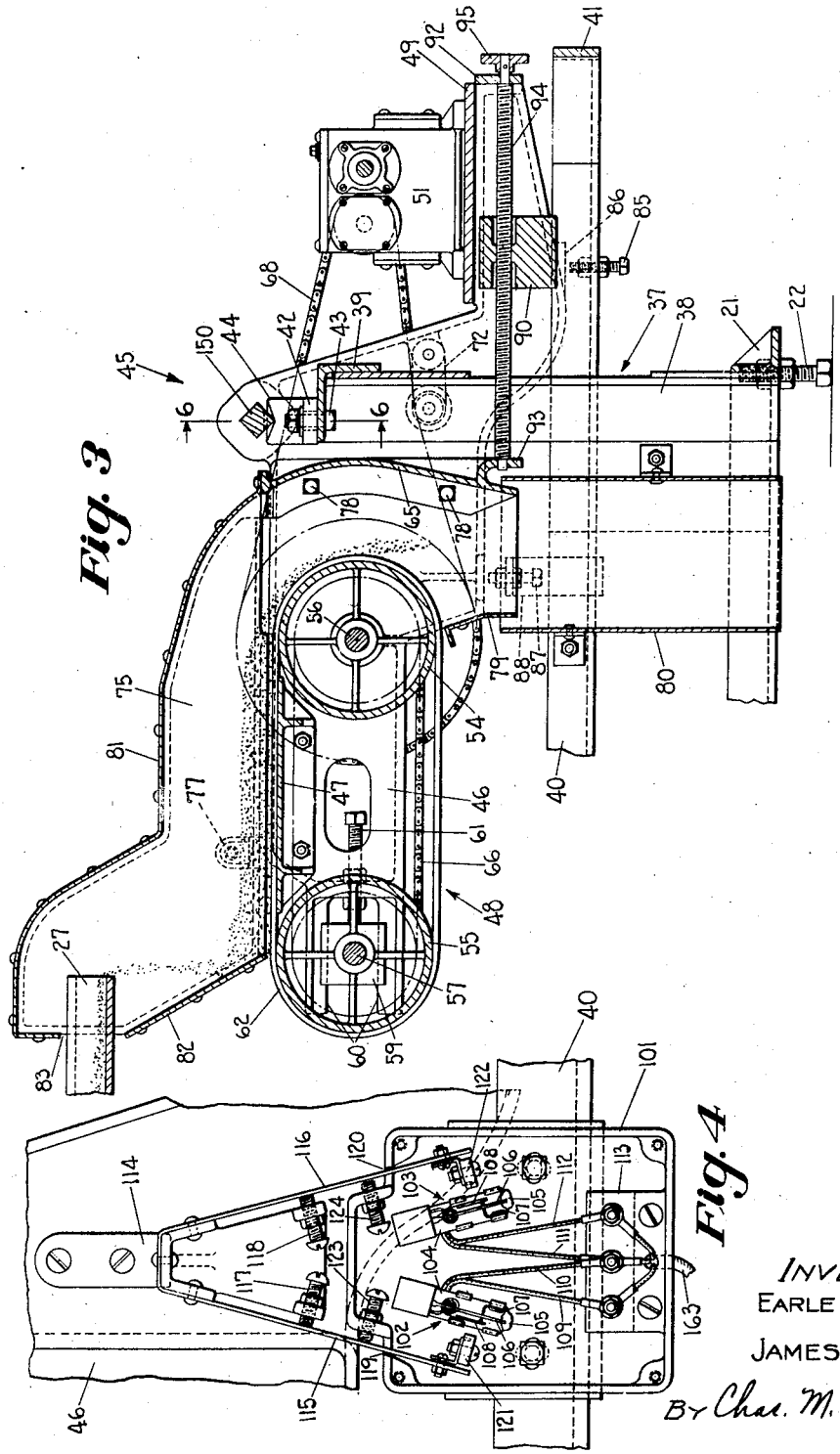
INVENTORS:
EARLE V. FRANCIS,
AND
JAMES A. FLINT,
By Chas. M. Nissen,
ATTY.

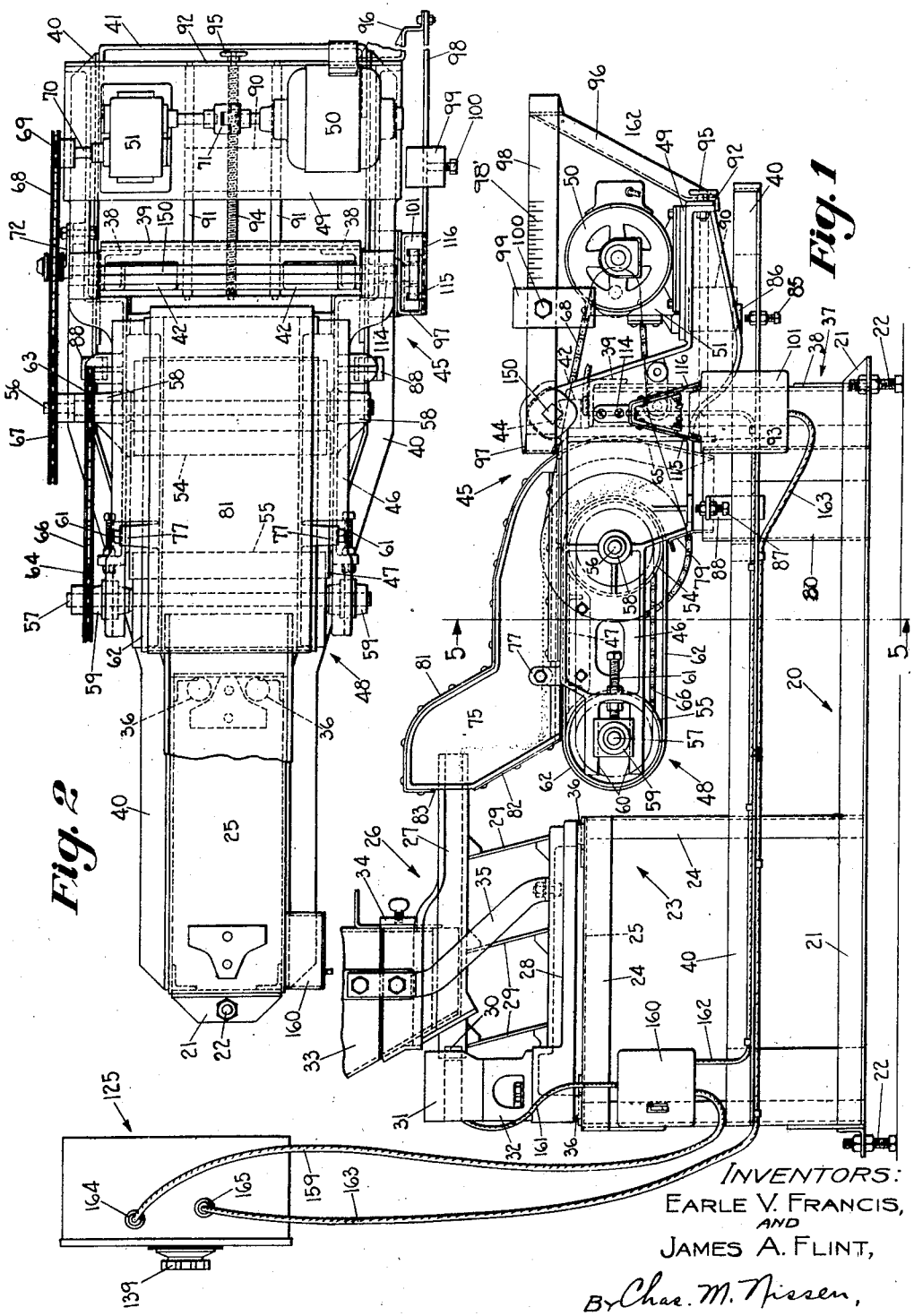

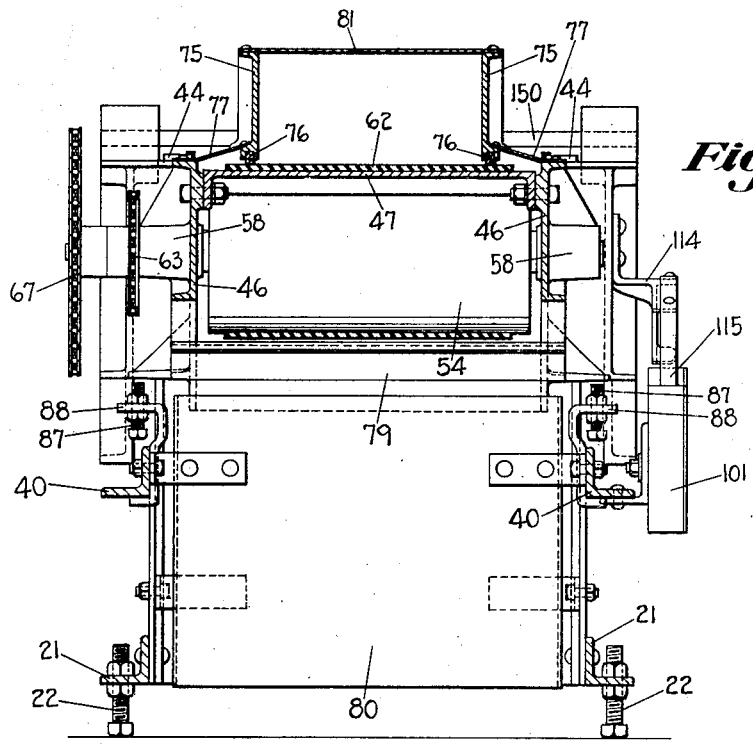
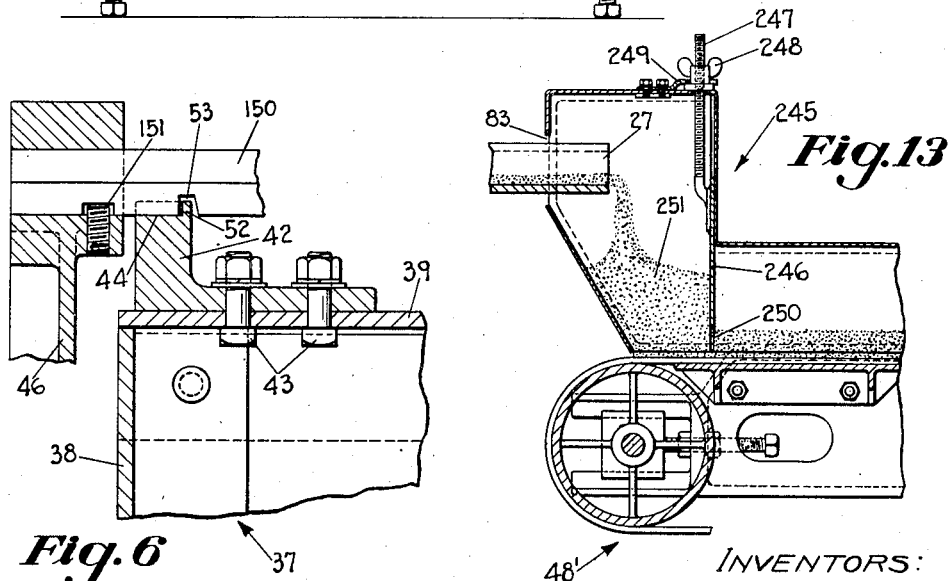

July 4, 1939.  E. V. FRANCIS ET AL  2,164,812
CONSTANT CAPACITY FEEDER
Filed June 10, 1936   5 Sheets-Sheet 4

INVENTORS:
EARLE V. FRANCIS,
AND
JAMES A. FLINT,
By Chas. M. Niesen,
ATT'Y.

July 4, 1939.  E. V. FRANCIS ET AL  2,164,812
CONSTANT CAPACITY FEEDER
Filed June 10, 1936  5 Sheets-Sheet 5

INVENTORS:
EARLE V. FRANCIS,
AND
JAMES A. FLINT,
By Chas. M. Nissen,
ATTY.

Patented July 4, 1939

2,164,812

UNITED STATES PATENT OFFICE 2,164,812

CONSTANT-CAPACITY FEEDER

Earle V. Francis and James A. Flint, Columbus, Ohio, assignors to The Traylor Vibrator Company, a corporation of Colorado Application June 10, 1936, Serial No. 84,496

21 Claims. (Cl. 221—118)

This invention relates to a constant capacity feeder.

An object of the invention is to provide a feeder which will feed material, particularly granular material, such as chemical salts, sand and like materials at a relatively slow and constant rate, and which is entirely automatic in its operation.

Another object of the invention is to provide a constant capacity feeder, the capacity of which may be variably determined and which will operate entirely automatically to deliver material at a constant rate and in relatively small quantities.

Still another object is to provide a constant capacity feeder in which the starting period, which is a transient period during which the rate of feed is not constant, is reduced to a minimum, thereby providing a device which has a relatively short correction time.

Another object of the invention is to provide a constant capacity feeder which may be of either the constant weight or the constant volume type.

Another object of the invention is to provide an improved control means and control circuit for a feeder.

Other objects of the invention will appear hereinafter, the novel features and combinations being set forth in the appended claims.

In the accompanying drawings,

Fig. 1 is a side elevational view of the device comprising my invention;

Fig. 2 is a plan view of the device of Fig. 1 with parts removed for clearness;

Fig. 3 is a sectional elevational view taken along a longitudinal axis of the device of Figs. 1 and 2;

Fig. 4 is an elevational view of the control switches with the cover plate of the switch box removed;

Fig. 5 is a transverse sectional view taken on the line 5—5 of Fig. 1 looking in the direction of the arrows;

Fig. 6 is a transverse sectional view taken on the line 6—6 of Fig. 3 looking in the direction of the arrows;

Fig. 13 is a sectional elevational view showing a modified form of the invention.

Figure 7:
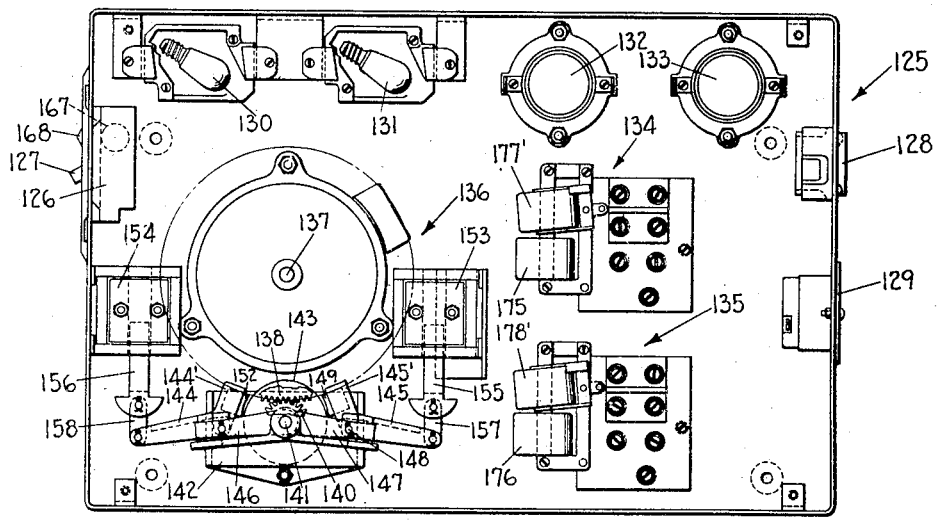
Fig. 7 is a front elevational view of the control mechanisms shown with the cover plate of the control box removed and eliminating the electric conductors in the interest of clearness.

Many problems arise in which it is desirable to feed a constant weight or constant volume of material at a relatively slow rate. Examples of this are found in the treatment of drinking water, carried on by municipalities in which chemical salts are desired to be fed at a uniform slow rate to the water. The invention herein disclosed provides a completely automatic system for feeding such chemical salts to a stream or container of water and provides means whereby the rate of delivery may be adjusted as desired. It will be evident that the invention is capable of more general application, the example given only being a typical illustration.

Referring particularly to Figs. 1, 2 and 3 of the drawings, our invention comprises a main frame 20 formed of longitudinal and transverse angle members 21 provided with adjustable legs 22 whereby the said main frame 20 may be leveled. Adjacent its rear end, the main frame carries a supporting stand 23 which may also be formed of appropriate angle members 24 and an appropriate supporting top plate 25. Upon said stand 23 is mounted a vibratory conveyor 26 which preferably takes the form disclosed and claimed in the copending application of James A. Flint and Arthur D. Holt, Serial No. 17,244, filed April 19, 1935.

Briefly described, said vibratory conveyor 26 comprises a trough type deck 27 supported away from a base 28 by cantilevers 29 which make an acute angle with the plane of said deck 27. Adjacent its rear end, the deck 27 carries an armature 30. Adjacent the rear end of the base 28 is mounted a field structure 31 supported by a bracket 32. The field structure 31 may be energized in a manner, hereinafter described in more detail, to impart vibratory motion to the deck 27, which, due to the angular relation of the cantilevers 29 will convey material to the right, as viewed in Fig. 1, at a rate dependent upon the amplitude of vibration of said deck 27.

Positioned above the deck 27 is a feed hopper 33 provided with an adjustable gate mechanism 34, and supported away from the base 28 by arms 35. The base 28 preferably sits on the stand 23 and is supported by rubber shoes 36.

In the operation of the vibratory conveyor 26 some vibration will be transmitted to the base 28 which, in turn, will be transmitted through arms 35 to the hopper 33. This will insure a continuous feeding of the material in the hopper 33 to the deck 27 and prevent arching of material in said hopper. The deck 27 is positioned to feed material into a scale device, hereinafter described in more detail.

Adjacent the front part of the main frame is an upstanding support 37 formed by a pair of spaced vertical angle members 38, 38 connected together across their tops by a transversely extending angle member 39 (see Fig. 3). Reinforcement of the support 37 and the stand 23 is provided by a pair of longitudinally extending angle members 40 which are connected together at their forward ends by a transversely extending plate 41.

As best seen in Figs. 2, 3 and 6 of the drawings, adjacent each end of the transverse angle member 39 there is provided an L-shaped bracket 42 which is rigidly attached to the angle member 39 as by nuts and bolts 43, and which provides a fulcrum bearing 44 for a fulcrum or beam type scale mechanism, hereinafter described in complete detail.

Mounted for free pivotal movement on the fulcrum bearings 44 provided by the brackets 42, is a beam type scale mechanism 45. Said scale mechanism 45 comprises a scale frame formed by a pair of longitudinally extending side plates 46 which may be in the form of castings which are attached together at one end by a transversely extending plate 47 which forms the bottom plate of a belt type conveyor generally designated by the character 48. At the other end, said side plates 46 are connected by a transversely extending bed plate 49 which forms the support for a driving electric motor 50 and a speed reduction mechanism 51 for the conveyor 48.

As best seen in Figs. 1, 2, 3 and 6, the scale mechanism 45 will be pivotally supported upon the fulcrum bearings 44 by a transversely extending square shaft 150 which is removably attached to the side plates 46, as by set screws 151 (see Fig. 6). The lower knife edge of the square shaft 150 will ride in the fulcrum bearings 44 at each end of said shaft 150. As clearly illustrated in Fig. 6 of the drawings, the fulcrum bearings 44 will be provided with an upstanding inner end wall 52 which extends into a notch 53 on the square shaft 150 thereby to restrict lateral movement of the scale mechanism 45 with respect to the support 37, thus insuring that said scale mechanism 45 will be entirely free to pivot at all times.

The belt type of conveyor 48 is formed by a pair of drums comprising a head drum 54 and a tail drum 55 mounted upon shafts 56 and 57 respectively, the former of which is carried by appropriate journal bearings 58, 58 formed integral with the side plates 46, 46, and the latter of which is carried by adjustable journal boxes 59 slidably mounted in appropriate guideways 60 formed in the side plates 46. Belt tensioning and journal box adjusting mechanism 61 in the form of a set screw may be provided to cooperate with the journal boxes 59 to provide for adjustment of the tail drum 55. Mounted upon the two drums 54 and 55 is a continuous belt 62 preferably made of fabricated rubber material. At one end, the shafts 56 and 57 carry sprockets 63 and 64 respectively, which are of equal size and which are connected by a chain 66 (see Fig. 2). In addition, the shaft 56 carries a sprocket 67 which receives a chain 68 driven by an appropriate sprocket 69 carried on a shaft 70 which extends from the speed reduction mechanism 51.

It may be mentioned that said speed reduction mechanism 51 is driven from the electric motor 50 through an appropriate coupling unit 71 and said speed reduction mechanism 51 will be effective to reduce appreciably the rate of rotation of shaft 70 as compared with the rate of rotation of the drive shaft of motor 50. In actual practice a ratio of 1600 to 1 has been employed.

In order to maintain proper tension on the chain 68, we may also provide an adjustable chain tensioning device 72 (see Figs. 2 and 3). It may also be mentioned that the sprockets 67 and 69 are of different size and a different drive ratio between the motor 50 and the conveyor 48 may be effected by reversing said sprockets 67 and 69.

In addition to those elements previously described, the conveyor 48 comprises a hood formed of side plates 75, 75, the bottoms of which are provided with wipers 76, 76 (see Fig. 5) adapted to wipe the upper run of belt 62 and prevent lateral spilling of material from said belt 62. The side plates 75, 75 of said hood are supported from the side plates 46, 46 of the scale mechanism 45 by appropriate brackets 77 and cooperating machine screws and by machine screws 78 (see Fig. 3) which extend through the flanges of the front spacer plate 65 of a guiding chute 79 of said scale mechanism 45, and into appropriate threaded apertures in the side plates 46. The chute 79 provides an appropriate guide for the granular material which is conveyed by the conveyor 48 and discharged over the head drum 54. The discharged material will fall from the chute 79 into a stationary chute 80 carried by appropriate brackets on the main frame 20 and angle members 40.

Extending transversely across the tops of the side plates 75 is a top cover plate 81. Adjacent their rear ends the side plates 75 carry a sloping back plate 82 which terminates adjacent the belt 62 and at a position directly above the axis of shaft 57. As clearly seen in Fig. 3 of the drawings, the top plate 81 and back plate 82 cooperate to provide an opening 83 through which the deck 27 of the vibratory conveyor 26 may extend. It is to be noted that said opening 83 is of sufficient size to permit an appreciable amount of pivotal movement of the scale mechanism 45 without contacting said deck 27.

It may also be noted, particularly by referring to Fig. 1 of the drawings, that the angle members 40 carry a pair of adjustable stop means 85, 85 adapted to restrict the pivotal movement of the scale mechanism 45 in one direction by contacting brackets 86, 86 formed integral with the side plates 46, 46. A tilting movement of the scale mechanism 45 in the other direction is effected by a pair of adjustable stop means 87, 87 carried by brackets 88, 88 rigidly attached to angle members 40.

In order to provide for the balancing of the scale mechanism 45 when it is unloaded, we provide an adjustable weight 90 supported by a pair of longitudinally extending smooth shafts 91, 91 (see Fig. 2) which are carried by a transversely extending plate 92 which extends between side plates 46 and is rigidly attached thereto, and by a transversely extending plate 93 formed integral with the plate 65. (Fig. 3.) The weight 90 is provided with a pair of smooth apertures which slidably receive the shafts 91, 91 and provide a free sliding support for said weight 90. Said weight 90 is also provided with an additional aperture which is screw threaded to receive a threaded shaft 94 also carried between the plates 92 and 93 and mounted for free rotation with respect thereto. An operating knob 95 (Fig. 3) is provided to afford rotation of the shaft 94. It will be obvious that rotation of the shaft 94 by the knob 95 will produce a longitudinal movement of the weight 90 whereby to balance the scale mechanism 45.

While not generally so employed, the adjustable weight 90 may also be employed to vary the feeding rate of the constant capacity feeder. It is preferred, however, that an additional adjustable weight be provided for this purpose, which will now be described. Said additional adjustable weight mechanism comprises an upstanding bracket 96 carried by one of the side plates 46 and a bracket 97, also carried by said one side plate 46. Between said brackets 96 and 97 extends a weight beam 98 upon which is slidably mounted an adjustable weight 99 provided with a set screw 100. The weight 99 may be adjusted so as to determine the rate of feed of the constant capacity feeder and by screwing the set screw 100 home, the rate of feed will be insured to be constant.

The beam 98 is so mounted that a horizontal plane through the center of gravity of the weight 99 preferably passes through the fulcrum point of the scale mechanism 45 with the result that the arm 98 may be calibrated so that equal movements of said weight 99 from the fulcrum point will produce equal increases in the rate of feed of the constant capacity feeder. A suitable scale 98' may be provided in accordance with such calibration. It can readily be seen by referring to Fig. 1 that the farther the weight 99 is adjusted away from the fulcrum 44, the greater will be the weight of the material fed at a constant rate from the conveyor belt 62.

In order to control the rate at which material is fed by the vibratory conveyor 26 to the belt type conveyor 48 of the scale mechanism 45 and thereby to maintain a balanced condition of the scale mechanism 45 at all times, I provide a control mechanism now to be described, which controls the rate of feed of said vibratory conveyor 26 by the balanced or unbalanced condition of said scale mechanism 45. Said control mechanism comprises a switch box 101 mounted upon one of the angle members 40 and within which is mounted a pair of mercury tube switches 102 and 103. (See Fig. 4.) Each of said tube switches 102 and 103 comprises a glass tube 104 within which is a small amount of mercury 105 into which extends a stationary contact 106. A spring mounted movable contact 107 carries a magnetic member 108, such as a plate of iron, which may be attracted by a magnet to pull the contact 107 into the mercury 105 to close said switch 102 or 103. Appropriate leads 109, 110, 111 and 112 are provided for the switches 102 and 103. The first two mentioned leads are provided for switch 102 and the last two for switch 103. Said leads 109, 110, 111 and 112 extend to appropriate connecting posts carried by an insulated terminal block 113, mounted within the switch box 101.

Associated with one of said side plates 46 and rigidly attached thereto, is an inverted U-shaped bracket 114 carrying a pair of spring fingers 115 and 116 which may be adjusted by adjusting screws 117 and 118, respectively. The spring fingers 115 and 116 are adapted to extend into apertures 119 and 120, respectively, of the switch box 101, and carry at their ends permanent magnets 121 and 122, respectively. Also carried by the switch box 101 are adjusting screws 123 and 124 which cooperate with the spring fingers 115 and 116, respectively, to limit their movements.

It will be evident that if the scale mechanism 45 tilts about its fulcrum in a clockwise direction, the permanent magnet 122 will be brought in proximity to the mercury tube switch 103 and will be effective to attract the plate 108, thereby to close the contacts of said switch 103. A counter-clockwise tilting of the scale mechanism 45 will produce movement of the permanent magnet 121 in proximity to the mercury tube switch 102 with the consequent attraction of the plate 108 thereof and the closing of the contacts of said switch 102. When the scale mechanism 45 is in a condition of equilibrium the contacts of both switches 102 and 103 will be open. It is thus manifest that the circuits to switches 102 and 103 may be controlled by the balanced or unbalanced condition of the scale mechanism 45, and when an unbalanced condition is realized one or the other of said switches will be closed, depending upon the direction of unbalance.

It may be mentioned that said switches 102 and 103 are connected in a circuit to control the rate of feed of the vibratory conveyor 26 and when switch 102 has its contacts closed, the rate of feed of said vibratory conveyor 26 will be reduced while, when switch 103 has its contacts closed, the rate of feed thereof will be increased. When the contacts of both of said switches are broken, the vibratory conveyor 26 will feed material to the conveyor 48 at a normal rate, which normal rate will be adjusted automatically in a manner hereinafter described in complete detail.

Before describing in detail the control circuit and control mechanism for the vibratory conveyor 26, it may be stated that said mechanism and circuit is so constructed and arranged that the vibratory conveyor 26 will feed material to the constant speed belt conveyor 48 of the scale mechanism 45, at a rate which is substantially that required to maintain the scale mechanism 45 in equilibrium. Upon a disturbance of the condition of equilibrium for a relatively short period, the rate of feed of said vibratory conveyor 26 will be either increased or decreased from its normal to compensate therefor. Should this condition of unbalance persist for a predetermined time, then automatic means are brought into operation to adjust the normal rate of feed of the vibratory conveyor 26. As a consequence, the apparatus is entirely automatic and will automatically adjust itself to feed material at a constant rate, and to compensate for any variations in the rate of feed of the vibratory conveyor 26 which is necessary to maintain the constant feeding of the belt conveyor 48.

Figure 9:
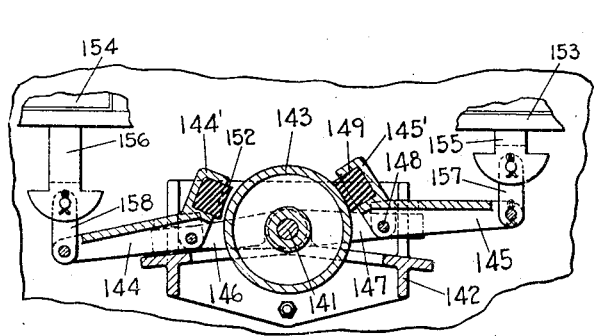
Fig. 9 is a sectional view of a detail and taken on the line 9—9 of Fig. 8 looking in the direction of the arrows.
Figure 8:
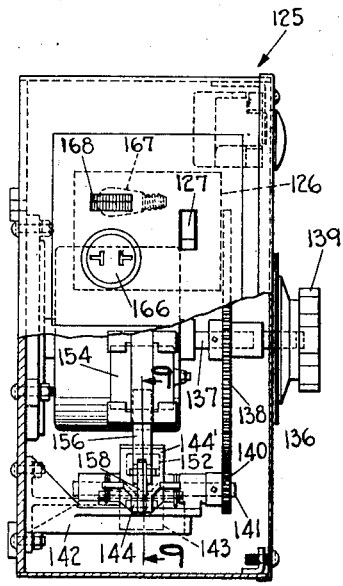
Fig. 8 is an end elevational view of the control box with part of the end wall broken away to show a portion of the internal mechanism thereof.

Attention is now directed to Figs. 7, 8 and 9 and to the control mechanisms used in conjunction with the electric control circuit, which will be described hereinafter. Said control mechanism comprises a control box 125 within which is mounted a master switch 126 which may be controlled by a lever 127 extending outside the said control box 125. Said control box is also provided with a pair of plug receptacles 128 and 129 adapted to receive terminal plugs of a common type. Also within the control box 125 is a pair of signal lamps 130 and 131, a pair of screw threaded resistor bases 132 and 133, and a pair of floating secondary transformer-relays 134 and 135. Also within said control box 125 is an adjustable auto-transformer 136 provided with an adjustable secondary tap which is controlled by a contactor carried on a rotatable shaft 137. Shaft 137 carries a large gear 138 within the control box 125 and also extends through the cover plate of said control box to receive an operating dial 139. The operating dial 139 may be adjusted to control the secondary tap of the auto-transformer 136, thereby to adjust the secondary voltage of said auto-transformer. Automatic adjustment of said tap is also provided by a pinion gear 140 which meshes with the gear 138 and is carried on a shaft 141 mounted in appropriate bearings upon a bracket 142 and carrying a friction drum 143. Cooperating with the friction drum 143 is a pair of oppositely extending pivoted levers 144 and 145 which are pivotally attached to stub levers 146 and 147 respectively, which stub levers are pivoted about the axis of shaft 141.

As illustrated in Fig. 9 of the drawings, when the level 145 is moved upwardly about its pivot pin 148 it forces a friction shoe 149 carried by a cup 145′ thereof, into frictional engagement with the drum 143 and thereupon movement of the lever 147 on its pivot 141 causes a small increment of rotation of said drum 143 in a counter-clockwise direction. A reverse movement of the lever 145 will produce no rotation of the drum 143 due to the fact that it will cause the shoe 149 to lift from the periphery of said drum 143. The lever 144 will be provided with a cup 144′ and a shoe 152 and when lifted upwardly will cause a small increment of rotation of the drum 143 in a clockwise direction. It will thus be evident that intermittent up and down movement of the lever 145 will cause intermittent counter-clockwise rotation of the drum 143 with the consequent adjustment of the adjustable secondary tap of the auto-transformer 136 which, for example, may decrease the output voltage thereof. In a similar manner intermittent up and down movement of the lever 144 will be effective to adjust the adjustable tap of the auto-transformer 136 to decrease the output voltage thereof.

To provide for the lifting of the levers 144 and 145 we provide a pair of solenoids 153 and 154, respectively, having cooperating plunger or core type armatures 155, 156, respectively, which are pivotally attached to the ends of the levers 145 and 144 respectively by links 157 and 158, respectively. The means to effect the intermittent operation of the solenoids 153 and 154 will be described in connection with the electric circuit. It will be obvious that when a solenoid, such as solenoid 153, is energized, it will lift its plunger 155 to swing the lever 145, to the position shown in Fig. 9 as previously described, and when said solenoid 153 is de-energized, its plunger 155 and the lever 145 will move downwardly under the influence of gravity. It may also be mentioned that when both of said solenoids 153 and 154 are de-energized the drum 143 will be free to rotate and thus the output voltage of the auto-transformer 136 may be readily adjusted by the operating dial 139.

Figure 11:
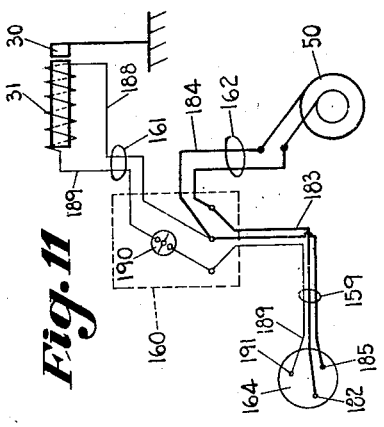
Fig. 11 is a wiring diagram of the circuits for the conveyor motors.
Figure 10:
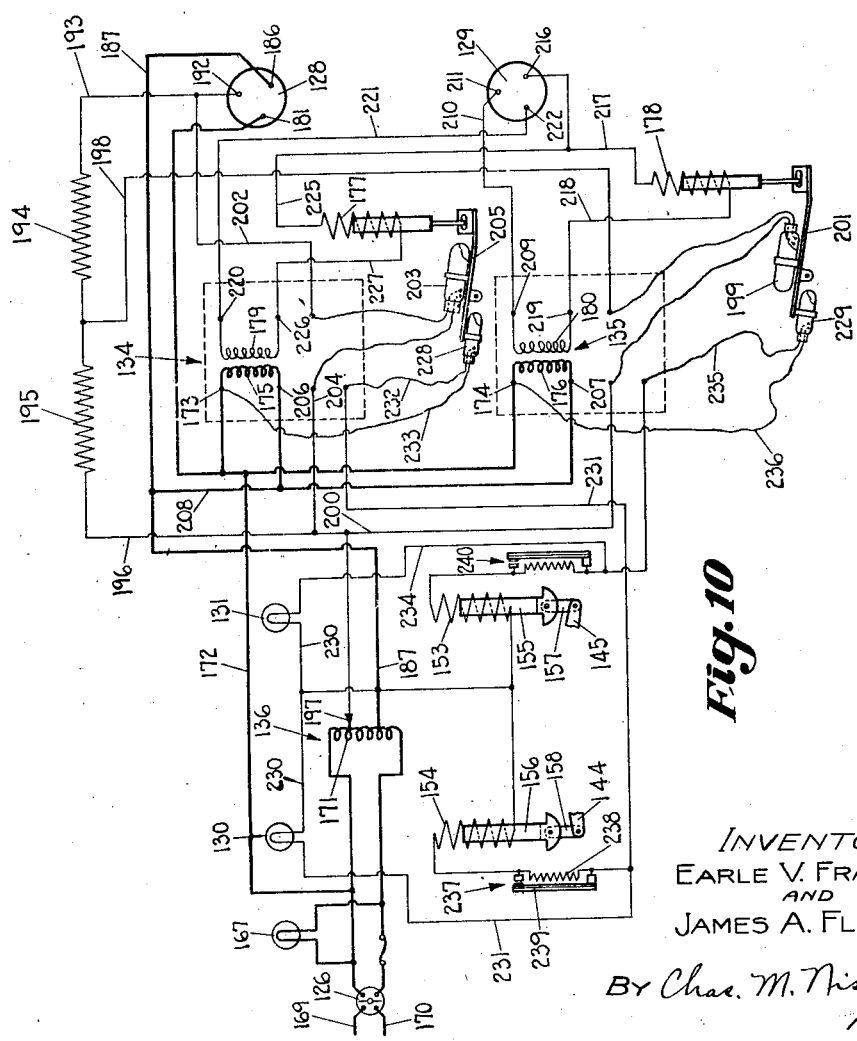
Fig. 10 is a wiring diagram for the control system which is contained within the control box illustrated in Fig. 7.

Attention is now directed particularly to Figs. 1, 10, 11 and 12 and to the electric circuit for controlling the constant capacity feeder. The circuits illustrated in Fig. 10 are all contained in the control box 125 while the circuits shown in Fig. 11 are attached to a cable 159 provided with a receptacle plug 164 adapted to be inserted into receptacle 128 and leading to a control box 160 for the vibratory conveyor 26 and the electric motor 50 of the belt conveyor 48. Individual branch cables 161 and 162 lead from the motor control box 160 to the field winding 31 of the vibratory conveyor 26 and to the electric motor 50, respectively. Another cable 163, provided with a receptacle plug 165 adapted to be inserted into receptacle 129, leads to the switches 102 and 103 in switch box 101. It will be evident that receptacle plugs 164 and 165 may be readily detached from the control receptacles 128 and 129 carried by control box 125.

In addition to the elements previously described in connection with the control box 125, it may be mentioned that the master switch 126 is provided with a plug receptacle 166 (Fig. 8) to receive a plug from a commercial source of power such as the usual 60 cycle power mains, and also carries on its top a small pilot light 167 which is visible from the outside through a red paned window 168 to indicate whether or not power is being supplied to the control circuit.

As seen in Fig. 10 of the drawings, power is supplied to the control circuit over a pair of power mains 169 and 170 which are controlled by master switch 126, across which mains is connected the pilot light 167. Connected directly across the mains 169 and 170 is the winding 171 of the auto-transformer 136. Connected to power main 169 is a conductor 172 which leads to terminals 173 and 174 of the primary windings 175 and 176 of the transformer-relays 134 and 135, respectively.

In the interest of clearness from an electrical viewpoint, we have shown in Fig. 10 of the drawings ordinary transformers with primaries 175 and 176 and separate relay solenoids 177 and 178 connected in circuit with the secondaries 179 and 180, respectively, of the transformers. In actual practice, however, instead of the separate transformers and solenoids, we prefer to employ the combination transformer-relays 134, 135 as illustrated in Fig. 7 of the drawings, which are provided with the floating type of secondary windings 177′ and 178′ which will operate in the same way as though separate relay solenoids 177, 178, and separate transformer secondaries 179 and 180 were employed. If desired, however, said individual transformers and individual solenoids, as illustrated in Fig. 10, may be employed.

In addition to connecting the terminals 173 and 174 to the power main 169, the conductor 172 leads to socket terminal 181 of the socket 128 which is adapted to receive and make electrical connection with terminal 182 of the plug 164. (Figs. 2 and 11.) Terminal 182 (Fig. 11) is connected by conductor 183 to one terminal of the electric motor 50, the other terminal of which is connected to conductor 184, which, in turn, is connected to terminal 185 of plug 164. Terminal 185 of plug 164 is adapted to make contact with terminal 186 of socket 128 when the plug 164 is inserted into the socket 128, said terminal 186 being connected to conductor 187, which is permanently attached to or near one end of the winding 171 of the auto-transformer 136. It will thus be seen that when switch 126 is closed and plug 164 is inserted in socket 128, a circuit will be provided to the electric motor 50. This circuit is not altered by any of the control mechanisms and will be effective to drive the motor 50 at a constant speed, said motor 50 being a constant speed type of alternating current motor, such as a synchronous motor.

It may be stated that the previously mentioned branch cable 162 includes the conductors 183 and 184.

The circuit to the electric motor 50 may be traced from the power main 169 through one side of switch 126, conductor 172, terminal 181, terminal 182, conductor 183 to one terminal of motor 50, thence from the other terminal of motor 50 through conductor 184, terminal 185, terminal 186, conductor 187, the end turns of winding 171 of auto-transformer 136, to main 170 through the other side of switch 126.

The circuit for the field winding 31 of the vibratory conveyor 26 also includes the previously traced circuit from main 170 to terminal 185 of plug 164 over conductor 188 to one terminal of field winding 31, thence over conductor 189 through switch 190 to terminal 191 of plug 164, thence to terminal 192 of socket 128, thence to conductor 193, control resistor 194, control resistor 195, conductor 196, to variable tap 197 of the auto-transformer 136. It may be pointed out that conductors 188 and 189 form the previously mentioned branch cable 161.

It may be noted from the description thus far given that the field winding 31 of the vibratory conveyor 26 has two resistors 194 and 195 connected in series therewith and the voltage supplied to the circuit for said field winding 31 may be varied by varying the position of the tap 197 of the auto-transformer 136. It may be mentioned that when the scale mechanism 45 is in a condition of equilibrium the resistor 195 will be shunted by circuits hereinafter described, while resistor 194 will remain in series with said field winding 31.

Should the equilibrium of the scale mechanism 45 be disturbed by a lack of sufficient material on the belt conveyor 48, then resistor 194 will also be shunted out, thereby increasing the rate of delivery of material by the vibratory conveyor 26. Should the equilibrium be upset by too much material on the conveyor 48, then both resistors 194 and 195 will be in series with the field winding 31 whereby to reduce the output of the vibratory conveyor 26. Should either condition of disturbed equilibrium be maintained for a predetermined time, then the variable tap 197 of the auto-transformer 136 should be properly adjusted to increase or decrease the voltage supplied to conductors 187 and 196, as the case may be, whereby to adjust the normal output of the vibratory conveyor 26 to a rate necessary to maintain the scale mechanism 45 in substantial equilibrium.

To provide for the control of the resistors 194 and 195 to determine whether only one or both, or neither, will be in series with the field winding 31, depending upon the condition of the scale mechanism 45, we provide the branch circuits now to be described. A shunt circuit for the resistor 195 is provided by conductor 198, mercury switch 199 and conductor 200. Mercury switch 199 is normally closed and is carried on a pivoted plate 201 controlled by solenoid 178, or in practice, by the floating secondary 178' of the transformer-relay 135. Therefore, with transformer-relay 135 de-energized, resistor 195 will be effectively short circuited. This is a normal running condition of the system with the scale mechanism 45 in equilibrium. A normally open shunt circuit is provided for both of the resistors 194 and 195 by a conductor 202 which leads to normally open mercury switch 203, the other terminal of which is connected to conductor 196 by conductor 204. Mercury switch 203 is carried on pivoted plate 205 which is controllable by solenoid 177, or in actual practice, by a floating secondary coil 177' (Fig. 7) of the transformer-relay 134.

It will be evident that, as the pivoted plate 201 is pivoted about its axis by solenoid 178 or floating secondary winding 178', the normally closed shunt circuit around the resistor 195 will be broken and said resistor 195 will be inserted in the circuit of the field winding 31, thereby reducing the rate of delivery of material by vibratory conveyor 26.

It will also be evident that, should plate 205 be tilted about its pivot, mercury tube 203, in cooperation with conductors 202 and 204, will provide a short circuit around both of the resistors 194 and 195, thus increasing the rate of delivery of material by the vibratory conveyor 26 above its normal value. The pivoted plates 201 and 205 are controlled, respectively, by the mercury switches 102 and 103 which are controlled by the scale mechanism 45, as previously described.

The primary windings 175 and 176 of the transformer-relays 134 and 135 will be connected directly to the power mains 169 and 170 by the previously mentioned connection to terminals 173 and 174 and by a connection of terminals 206 and 207, respectively, to the conductor 187 over branch conductor 208. It will thus be seen that the primaries 175 and 176 will be permanently connected across the power mains whenever master switch 126 is closed.

The circuit to solenoid 178 will be from terminal 209 of secondary 180 over conductor 210, terminal 211 of socket 129, terminal 212 of plug 165, conductor 213 of cable 163, to lead 109 of mercury switch 102, thence through mercury switch 102, to lead 110 thereof, to conductor 214 of cable 163, to terminal 215 of plug 165, to terminal 216 of socket 129, over conductor 217, solenoid 178, conductor 218, to terminal 219 of secondary 180. In the preferred modification it will be evident that, as has previously been mentioned, floating secondary winding 177' will take the place of solenoid 178 and transformer secondary 180.

The circuit for solenoid 177 will be from terminal 220 of secondary 179, conductor 221, terminal 222 of socket 129, terminal 223 of plug 165, conductor 224 of cable 163, lead 112 of mercury switch 103, through mercury switch 103 and lead 111 thereof, to conductor 214, which, over the previously traced circuit leads to conductor 217 to which is connected conductor 225 leading to solenoid 177, which is connected to terminal 226 of secondary 179, over conductor 227.

It may again be mentioned that in lieu of solenoid 177 and secondary 179, we prefer to employ floating secondary winding 177'. (Fig. 7.)

It will be evident from the above traced circuits that, whenever the amount of material on the conveyor 48 falls below that required to maintain the scale mechanism 45 in balance, mercury switch 103 will close its contacts with the consequent energization of solenoid 177 resulting in the closing of the contacts of mercury switch 203. This will short circuit both of the resistors 194 and 195 thereby increasing the rate of delivery of the vibratory conveyor 26 to supply material to the conveyor 48 at a more rapid rate.

When equilibrium is re-established, both of the mercury switches 102 and 103 will have their contacts open and only resistor 194 will be in circuit with the field winding 31 of the vibratory conveyor 26, due to the fact that solenoid 177 will be de-energized, and mercury switch 203 will be in open circuit position.

Should the equilibrium of the scale mechanism 45 be disturbed due to an excess of material on the conveyor 48, the mercury switch 102 will be closed, as previously described, with the consequent energization of solenoid 178 over the previously described circuit. This will tilt the plate 201 and open the contacts of mercury switch 199, breaking the normally closed shunt or short circuit around the resistor 195 which includes conductor 198, switch 199 and conductor 200. Resistor 195 will then be inserted along with resistor 194 in series with the field winding 31 of the vibratory conveyor 26, thereby cutting down its rate of material delivery to the conveyor 48, thus resulting in the equilibrium of the scale mechanism 45 again being restored.

It is to be noted that the condition of pivoted plates 201 and 205 is an indication of the rate of delivery of the vibratory conveyor 26. When both of said plates are in the positions illustrated in Fig. 10, said vibratory conveyor 26 will be delivering material at its normal rate with only resistor 194 in series with field winding 31 thereof. If plate 205 is tilted, vibratory conveyor 26 will deliver material at an increased rate, while if plate 201 is tilted, it will deliver material at a decreased rate, as previously described.

To indicate the rate of delivery of the vibratory conveyor 26, we provide mercury switches 228 and 229 carried by plates 205 and 201 respectively, which are normally open and which control signal lamps 130 and 131, respectively. The circuit for signal lamp 130 will be from conductor 187 over conductor 230, lamp 130, conductor 231, lead 232, the terminals of mercury switch 228, lead 233, to terminal 173 which is directly connected to power main 169, as previously described.

It will be evident that when plate 205 is tilted, switch 228 will be closed and lamp 130 lighted. The circuit to lamp 131 is from conductor 187, over conductor 230, lamp 131, conductor 234, lead 235, to one terminal of switch 229, thence over the other terminal of switch 229, to lead 236, thence to terminal 174, which is also connected to main 169, as previously described. It will thus be evident that when plate 201 is tilted, switch 229 will be closed and lamp 131 lighted.

In parallel with lamp 130 we provide a circuit including the previously mentioned solenoid 154 and a resistor type of blinker mechanism 237, which comprises a heating resistor 238 and a bi-metallic member 239, which, when heated for a predetermined time by heater 238, forms a shunt circuit therefor. A blinker mechanism 240, similar to the blinker mechanism 237, is also provided in a shunt circuit including solenoid 153.

Whenever mercury switch 228 is closed it will not only illuminate lamp 130, but also will send current through the heating resistor 238 and through solenoid 154. Due to the resistance of said resistor element 238 this current will be insufficient to lift up the plunger 156 associated with solenoid 154. However, should said switch 228 remain closed for a predetermined time, bi-metallic element 239 will be deflected under the influence of heating resistor 238 to shunt out said heating resistor 238, and thus cause sufficient current to flow through solenoid 154 to lift the plunger 156. As previously described in connection with Figs. 7, 8 and 9, this lifting of the plunger 156 will be effected to give one step to the variable tap 197 of the auto-transformer 136 in a direction to increase the voltage supplied to the conductors 196 and 187, which will, of course, increase the voltage supplied to the winding 31 of the vibratory conveyor 26.

It will be evident that, if switch 228 remains closed for a relatively long time, blinker mechanism 237 will operate to cause an alternate opening and closing of the shunt of the resistor 238 with the consequent ratchet like action of the lever 144 producing continued step by step motion of the variable tap 197 to increase the voltage supplied to winding 31. The blinker mechanism 240 will cooperate with the solenoid 153, under the control of mercury switch 229 to reduce the voltage supplied to the conductors 196 and 187 by shifting the variable tap 197 should said switch 229 remain closed for a prolonged period. It is thus evident that the control for the vibratory conveyor 26 is entirely automatic and the voltage supplied thereto will be controlled by controlling the resistance of the circuit leading to the winding 31 thereof if only for a short period, but if for an extended period an additional control of the voltage supplied to the lines 196 and 187 will be effected.

In the operation of the device comprising our invention, the scale mechanism 45 will be brought to a condition of equilibrium by adjusting the weight 99 is set to deliver 200 pounds of a given conveyor 48 and with the weight 99 in its zero position, or along the fulcrum point of said scale mechanism 45. Weight 99 will then be set to any desired position depending upon the rate of feed of the material which is desired. In this connection it may be mentioned that for any given material the rate of feed will be constant for any fixed position of the weight 99.

Furthermore, a rather wide variation in the density of material to be fed will not alter the setting of the weight at 99. For example, if said weight 99 is set to deliver 200 pound of a given material an hour, an example of which may be soda ash, this rate of delivery will be maintained constant even though the density of the material varies as much as fifty percent. It has been found in practice that materials of widely different densities, such as sand and cork, the former of which has a density more than ten times that of the latter, the same setting of the weight 99 will not produce exactly the same rate of delivery, though the variation is not great. However, for any given material the rate of delivery will be constant within measurable limits, and so long as the density does not vary more than fifty percent the delivery rate will be substantially constant.

It is to be particularly noted that as the material is fed by the vibratory conveyor 26 to the belt conveyor 48, it drops on the sloping back plate 82, which has a tendency to form the material at a substantially uniform depth on the belt 62. The belt 62 then carries the material toward the fulcrum point of the scale mechanism 45. This direction of movement is very important to reduce to a minimum the time required to bring the scale mechanism 45 to a stable condition. This is due to the fact that as the material is conveyed towards the fulcrum point the length of its lever arm decreases and thus the balancing torque thereof is progressively reduced. Without this progressive reduction in the balancing torque of the material it is very difficult to bring a constant capacity feeder into a condition of equilibrium, because there is a tendency for it to feed in batches. That is, material will be fed thereto until a certain weight is received sufficient to maintain a condition of equilibrium. The feeding conveyor will then be shut off entirely until this batch of material is completely dumped from the conveyor. As a consequence, the conveyor will be practically empty and another batch will be dumped, this procedure being continuously repeated.

In the device herein disclosed, however, the effective balancing power of the material is progressively decreased and in a relatively short time a stable condition of equilibrium is reached, after which the feeder delivers material at a substantially constant rate. It has been found in practice that for practically any material it forms substantially equal depth through the entire length of travel thereof on the belt 62.

Figure 12:
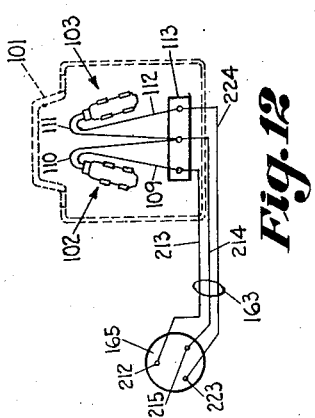
Fig. 12 is a wiring diagram for the control switches of Fig. 4.

During the starting of the device into operation, the scale mechanism 45 will go into and out of equilibrium, first to one side and then another, with a consequent operation of the control circuits of Figs. 10, 11 and 12 to increase or decrease temporarily the rate of delivery of the vibratory conveyor 26, and to determine automatically the normal rate of delivery of said vibratory conveyor 26. After a relatively short period said vibratory conveyor 26 will be automatically adjusted so that when the scale mechanism 45 is in equilibrium it will be delivering material at substantially the same rate that conveyor 48 discharges material. This is a normal operating condition and any supply fluctuations in the rate of delivery of the vibratory conveyor 26, which may be caused by voltage fluctuations on the line, or any other reasons, will produce a temporary increase or decrease in the rate of delivery thereof, as determined by the scale mechanism 45, thereby to return said scale mechanism 45 to a condition of equilibrium. As a consequence, a constant quantity of material will be discharged over the head drum 54 of the conveyor 48 and through the chute 80, notwithstanding fluctuation of main line voltage.

Attention is now directed to Fig. 13 of the drawings in which we have shown a modified form of constant capacity feeder which is essentially a constant volume feeder. It may be mentioned that the previously described device is essentially a constant weight feeder and by proper adjustment the device of Fig. 13 may be converted from a constant volume feeder to a constant weight feeder. As illustrated in said Fig. 13, the only alteration in the system is in connection with the belt conveyor 48' which will follow the construction of belt conveyor 48 except for the differences specifically pointed out. Said belt conveyor 48' comprises a casing 245 adapted to provide an adjustable gate 246 having an upstanding threaded shaft 247 provided with a wing nut 248 held in place by bracket 249 and adjustable to adjust the size of an orifice 250 provided by gate 246. The weight 90 or the weight 99 is adjusted with reference to the specific gravity of the material 251 being conveyed and to the size of the orifice 250 so that said material 251 will form in a pile behind the gate 246. The control mechanism is adjusted so that the pile may have an average height, as indicated in Fig. 13.

It is evident that the belt of the conveyor 48', which travels at constant speed, will carry a constant volume of material through the orifice 250 and the automatic control mechanism will operate to insure the presence of sufficient material in the pile behind the gate 246 to maintain this constant flow of material 251. It will be evident that by adjusting the size of the orifice 250, as provided by wing nut 248, the volume of material delivered may be adjusted as desired. It is also obvious that by lifting the gate 246 to its maximum position, or to any position so that the orifice 250 is not completely filled with material at all times, the device will be converted from a constant volume feeder to a constant weight feeder.

It is thus evident that, by employing the device as modified in accordance with the disclosure of Fig. 13, either a constant weight or a constant volume feeder may be provided, either of which may be embraced by the expression, "constant capacity feeder".

It would also be evident that if the material 251 is of substantially constant density, then the constant volume feeder will inherently be a constant weight feeder, though if there are any appreciable variations in the density of the material 251, this condition will not be realized.

It should be particularly noted that while the adjustable weight 90, as shown in Fig. 3, is useful in balancing the scale beam including the conveyor 48, when the latter is unloaded, the weight 99 in association with the weight scale 98' is relied on to regulate the weight of the feed from the conveyor 48. The greater the distance of the weight 99 from the fulcrum 44, the greater will be the weight of feed of the material from the conveyor 48. After once setting the weight 99 for a predetermined feed per minute, the delivery from the conveyor 48 of a continuous stream uniform in weight, is automatically maintained. The automatic control is quite sensitive in that any variation of feed by the electric vibratory feeder 26 will effect tilting of the scale beam in one direction or the other, resulting in automatic regulation of the feeder 26 to restore the sensitive balance of the scale beam. For instance, if the weight of the material on the belt 62, which is being driven at a constant rate of speed, is above the amount predetermined by the setting of the weight 99, the current in the electro-magnet 31 will be automatically decreased, thereby automatically decreasing the amplitude of vibration of the conveyor pan 27 of the feeder 26 and consequently decreasing the rate of feed of the material to the conveyor belt 62. If the weight of the material on the belt 62 falls below the amount predetermined by the setting of the weight 99, the rate of feed of the feeder 26 will be automatically increased. With the system of control shown in Fig. 10, whenever the scale beam is thrown out of balance, it is automatically brought back into balance so that the rate of feed by weight from the conveyor 48 will be automatically maintained. It will thus be seen that the conveyor 48 is driven at a uniform rate of speed and the weight of materal on the belt 62 is maintained constant notwithstanding variations in the delivery from the hopper 33 or variations in weight per unit of volume.

In the modification shown in Fig. 13 the volume of material fed from the conveyor 48' may be maintained at a uniform rate. The volume is controlled by the gate 246 but the weight of the material on the belt 62 is automatically maintained constant because it can pile up as illustrated at 251 in Fig. 13 in the nature of storage, while the volume as predetermined by the adjustment of the gate 246, is being delivered from the discharge end of the conveyor 48' at a uniform rate of speed. It can readily be seen that by regulating the speed of the motor 50, the belt 62 may be driven at a constant predetermined speed, and a constant volume of material fed from the belt 62 in accordance with the setting of the gate 246, without causing material to pile up at 251 to such an extent as to overflow from the opening 83.

However, as stated hereinbefore, it is preferred that the motor 50 shall be a constant speed electric motor such as a synchronous electric motor, but the speed reducer 51 may be adjusted to predetermine the rate of constant speed of the vonveyor 48 in accordance with the desired rate of speed of feed from the conveyor 48.

While some materials of granular nature having free flow characteristics, may be delivered at a uniform rate in a continuously flowing stream, such rate of speed of feed cannot be automatically regulated according to conditions by the use of the feeder 26 alone. The addition of the highly sensitive and automatic scale beam and electric control system herein disclosed, assures a very accurate regulation of the speed of feed at the point of delivery notwithstanding variations in the flow of the material before it reaches the balanced conveyor 48. Different kinds of granular materials will have various rates of flow according to the densities and even the same kinds of material will have different rates of flow at different times dependent upon their moisture content and the sizes of the granules, and furthermore some materials may be coarse and others fine thus having varying rates of flow under varying conditions dependent upon the climate. To a certain extent the volume flowing from the hopper 33 may be controlled by the gate 34 and the rate of feed from the pan 27 may be regulated by the manual control of the current strength in the magnet 31, but the flow from the hopper 33 into the pan 27 will vary and this will result in variations in feed from the delivery end of the pan 27 if the vibratory feeder 26 alone is relied on. What is desired is a great refinement in regulation of the delivery by automatically controlling the rate of feed from pan 27 so as to lay down a uniform layer of the material onto the belt 62 at its receiving end and thereby assure a constant flow at a uniform rate of feed from the belt conveyor 48. In other words, when variations of delivery of the material to the belt conveyor 48 at its receiving end occur, the electric system controlled by the tilting of the scale beam will automatically increase or decrease the delivery to the receiving end of the conveyor 48 until such equilibrium is established that the feed from the conveyor 48 at its discharge end will be maintained at a uniform rate of speed either as to weight in the form shown in Fig. 1, or as to volume and weight in the form shown in Fig. 13.

While the above described control system is particularly useful in connection with a constant capacity feeder, it has other fields of usefulness to maintain a normal condition under the control of a wide variety of condition indicators, to control the feed rate of a feeder and thereby maintain a substantially constant condition.

Obviously those skilled in the art may make various changes in the details and arrangement of parts without departing from the spirit and scope of the invention as defined by the claims hereto appended, and we therefore wish not to be restricted to the precise construction herein disclosed.

Having thus described and shown an embodiment of our invention what we desire to secure by Letters Patent of the United States is:

1. In a constant capacity feeder, the combination with a frame pivoted on a fulcrum, of a conveyor comprising a continuous belt and end rollers all carried by said frame, means for driving said conveyor at a constant speed and in a direction to convey material toward the fulcrum axis, adjustable means for balancing said frame about said fulcrum, a vibratory conveyor constructed and arranged to deliver material to said first mentioned conveyor, and means controlled by the balanced or unbalanced condition of said pivoted frame for controlling the delivery rate of said vibratory conveyor.

2. In a feeder, the combination with a frame pivoted on a fulcrum, of a conveyor comprising a pair of parallel drums and a belt carried by said frame on one side of said fulcrum, means for driving said conveyor at a constant speed and in a direction to convey material toward the fulcrum axis, means for balancing said frame about said fulcrum, a vibratory conveyor constructed and arranged to deliver material to said first mentioned conveyor, and control means for said vibratory conveyor constructed and arranged to control it as determined by the balanced or unbalanced condition of said pivoted frame, to maintain said frame in substantial balance.

3. In a constant capacity feeder, the combination with a frame pivoted on a fulcrum, of a conveyor mounted on said frame at one side of said fulcrum, said conveyor comprising a pair of parallel drums, a continuous conveying belt carried by said drums, a feed chute leading to the outer end of said conveyor, a discharge chute leading from the inner end of said conveyor, a constant speed motor carried at the other side of said fulcrum, and means connecting said motor and said conveyor whereby the latter will be driven by the former to convey material toward said fulcrum, at a constant speed.

4. In a constant capacity feeder, the combination with a frame pivoted on a fulcrum, of a conveyor mounted on said frame at one side of said fulcrum, said conveyor comprising a pair of parallel drums, a continuous conveying belt carried by said drums, a feed chute leading to the outer end of said conveyor, a discharge chute leading from the inner end of said conveyor, a motor carried at the other side of said fulcrum, and means connecting said motor and said conveyor whereby the latter will be driven by the former to convey material toward said fulcrum.

5. In a feeder, the combination with a frame pivoted on a fulcrum, of a conveyor carried by said frame at one side of said fulcrum, said conveyor comprising a pair of drums, a conveying belt carried by said drums, a hood for the upper run of said belt comprising a receiving chute providing a material banking plate and a discharge chute, a motor for driving said conveyor, and means at the other side of said fulcrum adapted to balance said frame.

6. In a constant capacity feeder, the combination with a frame pivoted on a fulcrum, of a conveyor carried by said frame on one side of said fulcrum, means for driving said conveyor at a constant speed to carry material toward the fulcrum, means for balancing said frame about said fulcrum, a second conveyor constructed and arranged to deliver material to said first mentioned conveyor, control means for said second conveyor constructed and arranged to control it under the supervision of said frame to deliver material to said frame to maintain said frame in substantial balance, and means cooperating with said first conveyor providing an orifice of fixed size through which material conveyed thereby will pass whereby a constant volume of material will be delivered from said first mentioned conveyor.

7. In a feeder, the combination with an electric conveyor, of a control circuit for said conveyor comprising a variable transformer, a circuit leading from said transformer to the motor of said conveyor including a plurality of resistors, shunt circuits for each of said resistors, a scale, circuit control means operated responsive to the position of said scale and so constructed and arranged that when said scale is in a predetermined normal position one of said resistors will be shunted, and when in another position all of said resistors will be shunted, and when in a third position none of said resistors will be shunted, whereby the delivery rate of said conveyor will be controlled by said scale, and means operative in response to a sustained positioning of said scale from its normal position to adjust the output voltage of said variable transformer.

8. In a feeder, the combination with an electric conveyor, of a control circuit for said conveyor comprising a circuit leading to the motor of said conveyor including a pair of resistors, shunt circuits for each of said resistors, a scale, circuit control means operated responsive to the position of said scale and so constructed and arranged that when said scale is in a predetermined normal position one of said resistors will be shunted, and when in another position both of said resistors will be shunted, and when in a third position neither of said resistors will be shunted, whereby the delivery rate of said conveyor will be controlled by said scale.

9. In constant volume feeding apparatus, the combination with a scale beam frame, of a conveyor mounted thereon, a hopper mounted on said frame and having a material banking plate and a restricted opening for effecting constant volume of feed from said conveyor, means for supporting the beam frame in balanced condition during delivery of material to said hopper and feed of material from said conveyor, means for delivering material to said hopper, and means controlled by the tilting of said beam frame for regulating said delivering means to cause feed from said conveyor to be maintained in constant volume.

10. In feeding apparatus, the combination with a receiving and feeding conveyor, of electro-magnetic means for controlling the feeding of material thereto, variable voltage means to control the rate of feed of said electro-magnetic means, electrical means for controlling said variable voltage means including a circuit having therein a blinker formed by a heating resistor and a heat responsive element for shunting said resistor, and constructed and arranged whereby said heating resistor will be periodically shunted when voltage is continuously applied thereto, thereby controlling said variable voltage means in steps, and weight responsive means for controlling the circuit to said blinker and electrical means.

11. In a feeder, the combination with a frame pivoted on a fulcrum, of a conveyor carried by said frame at one side of said fulcrum, said conveyor comprising a pair of end drums, a conveying belt carried by said drums, a motor for driving said conveyor to move material toward said fulcrum, vibratory feeder means for feeding said conveyor at a point removed from said fulcrum, and means operated by movement of said pivoted frame for controlling the rate of feed of said vibratory feeder means.

12. In a constant volume feeder, the combination with a scale frame pivoted on a main frame, of a constant speed belt conveyor including head and tail pulleys, a continuous belt and a hopper mounted on said scale frame, means providing a material banking plate and a restricted orifice controlling the flow of material from said hopper under the influence of said belt, and means operated by the unbalanced condition of said pivoted frame for maintaining material in said hopper above the top of said orifice.

13. In a constant capacity feeder, the combination with a belt conveyor, of means for driving said conveyor at a constant speed, weight responsive means operated continuously by the material on said conveyor, a vibratory electromagnetic feeder for feeding material to said belt conveyor at a controlled rate, control means for said feeder operated by said weight responsive means, said control means comprising immediately responsive means to increase or decrease the rate of feed of said feeder relative to a selected normal rate as the weight of material on said belt conveyor increases or decreases relative to a normal load, and means operative responsive to a sustained operation of said immediately responsive means to adjust the voltage applied to said immediately responsive means.

14. In a continuous weighing apparatus, the combination with a pivoted frame, of a conveyor including end drums and an endless belt all mounted on said frame, electro-magnetic vibratory feeding means for feeding material to one end of said conveyor, means for driving said conveyor at a constant speed and in a direction to convey said material from the position at which it is fed toward the pivotal axis of said frame, and means controlled by the balanced and unbalanced condition of said frame for adjusting the feed rate of said feeding means.

15. In a continuous weighing apparatus, the combination with a pivoted frame, of a conveyor including end drums and an endless belt all mounted on said frame, electro-magnetic vibratory feeding means for feeding material to one end of said conveyor, means for driving said conveyor in a direction to convey said material from the position at which it is fed toward the pivotal axis of said frame, and means controlled by tilting movement of said frame to adjust the feeding of said feeding means.

16. In feeding apparatus, the combination with an electro-magnetic feeder, means to control the rate of feed of said feeder in response to a variable condition including means for indicating a variable condition as normal or abnormal, means for adjusting the feed rate of said feeder to sustain approximately a normal condition comprising means immediately responsive to an abnormal condition to adjust the feed rate of said feeder, and electrical means responsive to a sustained abnormal condition to adjust the voltage supplied to said immediately responsive means.

17. In a feeder system, the combination with an electric feeder, of a control circuit therefor comprising a variable transformer, a circuit leading from said transformer to said feeder including a plurality of resistors, shunt circuits for each of said resistors, an operating condition indicator, circuit control means operative responsive to the position of said indicator and so constructed and arranged that when said indicator is in a predetermined normal position one of said resistors will be shunted, and when in another position all of said resistors will be shunted, and when in a third position none of said resistors will be shunted, whereby the delivery rate of said feeder will be controlled by said indicator, and means operative in response to a sustained positioning of said indicator from its normal position to adjust the output voltage of said variable transformer.

18. In a feeder system, the combination with an electric feeder, of a control circuit therefor comprising a circuit leading thereto including a pair of resistors, shunt circuits for each of said resistors, an operating condition indicator, automatically operable circuit control means operated responsive to the position of said indicator and so constructed and arranged that when said indicator is in a predetermined normal position one of said resistors will be shunted, and when in another position both of said resistors will be shunted, and when in a third position neither of said resistors will be shunted, whereby the delivery rate of said feeder will be controlled by said indicator.

19. In a constant capacity feeder, the combination with a pivoted frame, of an endless conveyor mounted on said frame and movable therewith, means for driving said conveyor at a constant speed and in a direction to convey material toward the pivotal axis of said frame, a vibratory electro-magnetic feeder constructed and arranged to deliver material to said conveyor, and means controlled by pivotal movement of said frame for controlling the delivery rate of said feeder.

20. In feeding apparatus, the combination with an electro-magnetic feeder, of means to control the rate of feed of said feeder in response to a variable condition including means for indicating a variable condition as normal or abnormal, electrically operable means constructed and arranged to be immediately responsive to an abnormal condition as indicated by said indicator to adjust the feed rate of said feeder, and electrically operable means constructed and arranged to respond to a sustained abnormal condition as indicated by said indicator to adjust the voltage supplied to said immediately responsive means.

21. In a feeder system, the combination with an electric feeder of the vibratory type, of a control circuit therefor comprising a plurality of resistors, shunt circuits for each of said resistors, an operating condition indicator, circuit control means operative responsive to the position of said indicator and so constructed and arranged that when said indicator is in a predetermined normal position one of said resistors will be shunted, and when in another position all of said resistors will be shunted, and when in a third position none of said resistors will be shunted, whereby the delivery rate of said feeder will be controlled by said indicator, and electrical means constructed and arranged to be operative in response to a sustained positioning of said indicator from its normal position to adjust the voltage applied to said resistors.

EARLE V. FRANCIS.
JAMES A. FLINT.